Patented Oct. 4, 1949

2,483,726

UNITED STATES PATENT OFFICE 2,483,726

POLYESTERS

Don E. Floyd, Minneapolis, Minn., assignor to General Mills, Inc., a corporation of Delaware No Drawing. Application September 8, 1945, Serial No. 615,246

10 Claims. (Cl. 260—75)

The present invention relates to the preparation of novel esters, particularly polyesters which are prepared from polyhydric alcohols and having an aliphatic hydrocarbon substituent.

A wide variety of polyesters have been described in prior patents. It has now been discovered that polyesters having novel and unusual properties may be prepared from malonates having an aliphatic hydrocarbon substituent in which the aliphatic hydrocarbon substituent may contain from 6 to 16 or more carbon atoms. Such products have been found useful for the preparation of drying oils, alkyd resins, modified alkyds, and related products; for the preparation of waxes, plasticizers for cellulose derivatives, polyvinyl derivatives, rubber, and other resins, plastics, and coatings. Variations in chain length and in the degree of unsaturation of the aliphatic hydrocarbon residues attached to the malonate radical alters considerably the characteristics and physical properties of the polyester products. The properties which can be altered and formulated at will include solubility, compatibility, viscosity, melting point, volatility, drying characteristics, adhesion to surfaces, elasticity, and many others.

It is, therefore, an object of the present invention to provide novel polyester products derived from malonates having a long chain aliphatic hydrocarbon substituent.

It has been found that the size of the lateral aliphatic hydrocarbon substituent and the degree of unsaturation of aliphatic hydrocarbon substituted malonic esters make a marked and noticeable difference in the properties of polyesters produced therefrom. Substituted malonates in which the lateral hydrocarbon substituent varies within the range of $C_6$ to $C_{16}$, both saturated and unsaturated, have been found to be valuable. Polyesters produced from such substituted malonic esters possess numerous advantages over polyesters produced from low aliphatic substituted malonates or unsubstituted malonates. It is believed that these advantages are due primarily to the effect of the long chain aliphatic hydrocarbon substituent.

The polyesters disclosed herein are considerably more soluble in hydrocarbon solvents than those prepared from unsubstituted or low aliphatic substituted malonates. This is an advantage in the preparation of wax formulations, solutions of coating materials, alkyd resin solutions, viscosity stabilizing materials, and related products where hydrocarbon solvents are generally used. In addition these polyesters are less viscous, since viscosity decreases and the oily character increases with the increasing size of the aliphatic hydrocarbon substituent. This is an advantage where the products are to be spread in films over surfaces as in the preparation of drying oils or alkyd-type resins. Those polyesters with substituents containing a high degree of unsaturation can be converted by heat or oxygen to tough, hard films of value in the field of drying oils and resins. These unsaturated polyesters are fast drying, particularly in the presence of metallic driers, and are superior in film strength and speed of drying to related products now commonly used. Extremely valuable drying oils and drying alkyd resins can be prepared from these unsaturated, high molecular weight malonic esters. It is obvious that corresponding polyesters from unsubstituted or low aliphatic substituted malonates have no comparable utility in this field since they lack the high degree of unsaturation. The polyesters disclosed herein are more resistant to the action of lower alcohols probably because the lateral substituent decreases the solubility in such solvents as it becomes more hydrocarbonlike in character. A further advantage is in the ease of manipulation of the substituted malonic esters during polyester formation. Since they are relatively high-boiling liquids compared to the unsubstituted or low-aliphatic substituted malonic esters, there is less likelihood of loss of ester through volatilization during the reaction at the high temperature required, particularly while the by-product alcohol is evolved. This becomes increasingly important when it is known that an excess of either reagent leads to smaller molecules which are usually of much less value. A further advantage ensues from the increased molecular weight of the higher aliphatic hydrocarbon substituted malonate. This means that on a weight basis much less of the expensive polyhydric material is required for reaction than with unsubstituted or low aliphatic substituted malonic esters and with many other acids or their esters. This is advantageous from a commercial standpoint.

The reaction is preferably carried out by alcoholysis between aliphatic hydrocarbon substituted malonic esters and polyhydric alcohols containing two or more reactive alcohol groups. The aliphatic hydrocarbon substituted malonic ester employed in the present invention may be prepared in accordance with any known method. It is preferred, however, to prepare these substituted malonates by the action of oxalate esters on various fatty acid esters as disclosed in my co-pending application, Serial No. 596,811, filed May 30, 1945, in which event the aliphatic hydrocarbon substituent will correspond to the aliphatic hydrocarbon group of the fatty acid beyond the alpha carbon atom of the fatty acid. In other words, this condensation results in an aliphatic hydrocarbon substituent which is the same as the aliphatic hydrocarbon chain on the fatty acid with the exception that the carboxyl group and the adjacent carbon atom are eliminated. These substituted malonates may then be reacted with polyhydric alcohols in accordance with the following equation.

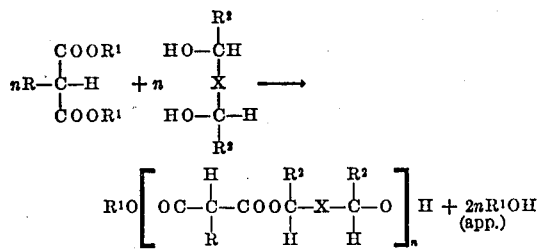

R represents an aliphatic hydrocarbon residue or mixtures thereof such as hexyl, decyl, cetyl, decenyl, tetradecadienyl, etc. and may be saturated or unsaturated. $R^1$ represents a low aliphatic group such as methyl, ethyl, propyl, butyl and the like. It is obvious that the two $R^1$ groups may be alike or different. $R^2$ may be hydrogen or alkyl. Here the two $R^2$ groups may also be alike or different. X may be methylene, ethylene, trimethylene, hexamethylene, decamethylene, or any other methylene chain or may include carbon or carbon chains connected by single or multiple bonds to which other groups may be attached, said groups including hydroxyl, alkyl, amino and other groups or combinations thereof. X may also represent nitrogen to which various groups may be attached, such as hydrogen, alkyl, alkanol, and the like; it may represent sulfur or it may represent cyclic groups such as those derived from benzene, furane, cyclohexane and the like.

This includes such polyhydric materials as ethylene glycol, diethylene glycol, polyethylene glycols, propylene and polypropylene glycols, trimethylene glycol, decamethylene glycol, other glycols, glycerol, mono-, di-, and tri-ethanolamines, polyglycols, polyglycerols, pentaerythritol, sorbitol, polyvinyl alcohol, tris-(hydroxymethyl)-amino-methane and many related compounds. The presence of other groupings not mentioned and not taking part in the reaction is by no means harmful and can be useful in developing special properties. Since many variations in the kinds of polyhydric materials not specifically mentioned here can be made without departing from the scope of the invention, the inventor does not desire to be limited to the substances specifically described in this application. For example, it is possible to use polyhydric materials not exemplified by the formula in the above reaction, such as cyclic compounds containing two or more reactive hydroxyl groups, provided they are not phenolic or enolic groups. Cyclohexanediols, cyclopentanediols, inositol and similar compounds might be included here. It is obvious that mixtures of these polyhydric materials may be employed in place of a single substance.

The letter "$n$" stands for a numerical figure representing the average number of monomeric units in the polyester. In cases where amino groups or hydroxyl groups, in addition to those illustrated in the equation above, are present, more complex products containing cross-linkages may result and the amount of alcohol ($R^1OH$) produced may differ from that shown in the equation.

Various catalysts for promoting the above described alcoholysis reaction may be employed. For example, alkali and alkaline earth metals, metal oxides and alcoholates, metallic salts of the malonates, metallic stearates, metallic soaps, metallic napthenates, metallic resinates and the like are valuable catalysts. The metallic group in such salts may be sodium, potassium, calcium, lead, zinc, lithium, barium, or various other metals as is known to those skilled in the art. While acidic catalysts may be used, they are not preferred as they produce some decomposition and darkening in color.

Ordinarily the polyhydric alcohol, malonate and catalyst are heated and stirred at temperatures in the range of 150–220° C. while the alcohol produced as a reaction by-product is distilled and collected. In cases where the reactants are subject to oxidation, it is of value to conduct such reactions in the presence of an inert gas such as carbon dioxide or nitrogen. It is possible to judge the extent of reaction by measuring or weighing the alcohol product as by-product. Thus, the reaction may be controlled to give relatively small molecules by stopping far short of complete reaction or to give larger molecules by allowing the reaction to proceed further. In many cases it is of value to apply a vacuum to the reacting materials. This excludes air and also tends to remove the by-product alcohol, thus promoting formation of large molecules. While it is known that such reactions never proceed to 100% completion, use of a molecular-still will cause reactions to approach very nearly to completion, producing very large molecules as a result.

Below 175° C. reaction is slow and requires a longer period of heating. In some cases reaction will not take place at all below 175° C. At temperatures above 220° C. the formation of large cyclic molecules tends to become more pronounced. In some cases this may be preferred if the macrocylic molecules are desired. However, ordinarily it is desired to have the linear or chain-type product predominate except where cross-linkages are sought. When the temperature reaches 275–300° C. the malonic esters begin to decompose. Use of a vacuum at these temperatures hastens the decomposition. In some cases, particularly those in which polyhydric materials containing only two reactive groups are used, it is of value to employ an excess of the polyhydric material in the reaction in which case materials of lower molecular weight are formed. These may then be condensed to form larger molecules by subsequent heating and removal of polyhydric alcohol usually by vacuum distillation. This insures against a deficiency or loss of polyhydric substance during the reaction, thus promoting the formation of large molecules.

It is feasible to conduct polyester formations in the presence of a solvent or diluent with very little modification of procedure. The solvent may be distilled off later or the product may be left dispersed in the solvent.

Where more than two reactive groups are present in the polyhydric material it is often desirable to modify the reaction product by including fatty acids or their low monohydric esters with the other reactants. Thus, it is possible to modify further such characteristics as viscosity, drying properties, solubility, etc., by including a monobasic acid or ester with the reactants. Such acids or esters may be derived from various sources, for example, rosin acids, acids from linseed, tung, soybean, oiticica, fish, and other animal and vegetable oils. Or they may be derived from oxidation of petroleum products or from chemical synthesis. A wide variety of acids and esters, with straight chain, branched chain, or cyclic groups, either saturated or unsaturated may be employed. They may contain various groups or atoms such as halogen, hydroxyl, amino, nitro, and many others. They may be derived from non-drying, semi-drying or drying oils.

The following examples will serve to illustrate the invention.

*Example 1*

184 grams (0.5 mole) of the mixed malonic esters prepared from soybean methyl esters and ethyl oxalate (in the manner described in my copending application) and 31 g. (0.5 mole) of ethylene glycol were allowed to react in the presence of a catalytic amount of zinc tetradecylmalonate. The mixture was vigorously stirred and heated in an atmosphere of nitrogen while the bath temperature was slowly raised from 150–200° C. during the course of about one and one-half hours. The temperature was maintained at 200° C. for one-half hour more. At this time no more alcohol distilled from the mixture and the total alcohol collected was nearly 84% of the theoretical. The reaction mixture was then heated at 200° C. while a vacuum was gradually applied. This was continued for three hours. By this time the pressure on the system was 2 mm. The alcohol evolved during the second stage of the reaction was collected in a dry-ice trap. The total was now 95% of theoretical. The molecular weight as determined by boiling point elevation method was 433.

The ester product was a light-colored oil, slightly viscous. When cast into films in the presence of cobalt and manganese driers, it showed no tendency to go beyond the tacky stage during 24 hours at room temperature. It is believed that this and other esters of 1,2-glycols with malonates are cyclic products with seven-member rings. This ester product has been found to be of considerable value as a plasticizer for cellulose acetate and other cellulose derivatives and to a lesser extent for vinyl resins.

*Example 2*

A similar reaction was conducted between 38.2 g. (0.1 mole) of the malonic esters prepared from the ethyl esters of Armour's Neo-Fat 3–R (60% linoleic–40% oleic acid mixture) and ethyl oxalate (in the manner described in my co-pending application) and 15.2 g. (0.2 mole) of trimethylene glycol in the presence of the same catalyst. In this instance the amount of alcohol collected at atmospheric pressure was nearly quantitative due to the excess of glycol used. The reaction product was then heated at 200° C. and 0.5 mm. for four hours and the excess glycol was distilled off during the alcoholysis. The molecular weight as determined by boiling point elevation method was 2020.

The final product was extremely viscous when cool, about the consistency of heavy molasses. It had excellent drying properties, being equivalent to linseed oil in speed of drying and in toughness of the film produced.

*Example 3*

38 grams (0.1 mole) of the linseed malonic esters prepared from linseed ethyl esters and ethyl oxalate and 21.2 g. (0.2 mole) of diethylene glycol were allowed to react in exactly the same manner as described in Example 2.

The final product after removal of excess glycol was found to be extremely viscous and had a pale color. The molecular weight as determined by boiling point elevation method was 2100. It was far superior to linseed oil in drying properties. With a concentration of 0.01% of cobalt and manganese as the naphthenate driers it was found to dry in air at room temperature to a tack-free film in less than two hours.

*Example 4*

244 grams (1 mole) of diethyl hexylmalonate and 106 g. (1 mole) of diethylene glycol were allowed to react in the presence of zinc hexylmalonate as catalyst. Since an excess of glycol was not used in this case the procedure indicated in Example 1 was followed. The polyester produced was even more viscous than those in the preceding examples. It appears to be a valuable plasticizer for cellulose acetate, other cellulose derivatives and a variety of resinous materials. It is less soluble in hydrocarbon solvents than previously described polyesters, but more soluble in certain other solvents, such as diacetone alcohol, ethyl acetate and acetone. The molecular weight as determined by boiling point elevation method was 1900.

*Example 5*

To 50 g. of diethyl decylmalonate and 10.2 g. of glycerol was added 0.3 g. of zinc decylmalonate. The reactants were vigorously stirred and slowly heated from 175° to 200° C. during the course of one hour and maintained at 200° C. for two hours more. By this time 12.7 g. of alcohol had been distilled off. The reaction product had become somewhat viscous. It was heated at 180° C. and 0.5 mm. for fifteen minutes and became quite sticky and more viscous. After fifteen minutes more it had become very viscous and would flow only with difficulty. It had valuable adhesive properties. Gelation occurred after heating in vacuum for fifteen minutes longer. The gelled resin was soft and rubbery and was quite light in color. The gel was infusible and appeared to be insoluble although it would swell in certain organic solvents.

*Example 6*

A similar reaction was conducted using 95 g. of the previously mentioned malonic esters prepared from linseed ethyl esters and 15.5 g. of glycerol in an atmosphere of nitrogen. The reaction seemed to pass through similar stages as in Example 5, but gelation was not allowed to occur.

A sample of the product obtained before any heating in vacuum was cast into a thin film with cobalt and manganese as the naphthenates in concentrations of 0.01%. The film had become tack-free in air at room temperature within 1½ hours.

*Example 7*

A reaction was conducted between 192 g. (0.5 mole) of diethyl cetylmalonate and 53 g. (0.5 mole) of diethylene glycol with 1 g. of zinc tetradecylmalonate in the same manner as in Examples 1 and 4.

The ester product solidified to a white, waxy substance when cool. The melting point of the wax was approximately 50° C.

*Example 8*

13.6 grams (0.1 mole) of pentaerythritol, 61 g. (0.2 mole) of linseed ethyl esters, 38 g. (0.1 mole) of malonic esters prepared from linseed ethyl esters and 0.3 g. of calcium stearate catalyst were vigorously stirred and heated at 220–230° C. in an atmosphere of nitrogen for two hours while the ethanol produced as by-product was distilled off. The mixture was heated for two more hours at this temperature and at 5 mm. pressure. By this time reaction was nearly complete as shown by the fact that only about 0.5% of hydroxyl was still present. A viscous, light-colored liquid was produced.

The reaction product was quite superior to a synthetic drying oil prepared from equivalent quantities of pentaerythritol and linseed fatty acids, both in speed of drying and in film strength. It was also superior to an alkyd resin prepared from pentaerythritol, phthalic anhydride and linseed fatty acids (in the molal proportion of 1:1:2) in drying time and film strength.

Instead of using the ethyl esters the reaction product described in paragraph 1 of this example can be prepared equally well by use of other esters of linseed fatty acids or by use of the free acids.

*Example 9*

A reaction was conducted between 76 g. (0.2 mole) of malonic esters prepared from linseed ethyl esters, 42 g. (0.4 mole) of diethanolamine and 222 g. (0.8 mole) of linseed fatty acids so that almost no free hydroxyl or amino groups remained, while the acid number dropped to 5.8. This reaction product or ester-amide was a light-colored, viscous liquid with valuable properties.

Numerous variations are possible both in the product and in the manner of carrying the reaction out. Thus, for linear polyesters equimolecular amounts of the malonic ester and polyhydric alcohol may be used. In the event that it is desired to limit the size of the reaction product, an excess of either reactant may be used. If the conditions of reaction are such that one of the reactants, for example, the polyhydric alcohol, is likely to be removed by vaporization it may be desired to start with an excess of that reactant. Temperatures may vary within the range 150–275° C. In general, however, temperatures between 180° and 220° C. are preferred.

The polyester preparations may be modified by use of various monobasic acids. These may be employed to produce softening, to prevent gelation, to promote formation of small molecules, to alter solubility, to lower viscosity, or for other purposes. It is possible to use the monobasic acid or a low aliphatic ester for this purpose.

The low molecular weight esters of the present invention, those having molecular weights within the approximate range 400–1000, whether linear or cyclic, are particularly adapted for use as plasticizers, as they are, in general, quite compatible with most resins. Higher molecular weight esters, those in excess of 1000, are in general less compatible with resins and accordingly are less adapted for use as plasticizers, although some of these higher molecular weight esters are useful for that purpose. The unsaturated higher molecular weight esters are excellent drying oils, whereas the saturated esters in excess of a molecular weight of 1000 are generally wax-like.

While various modifications of the invention have been described, other modifications will be apparent to those skilled in the art and accordingly it is intended to limit the invention only by the appended claims.

I claim as my invention:

1. A polyester of a polyhydric alcohol in which the polyfunctional acyl group has the formula

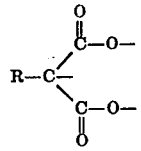

in which R is an aliphatic hydrocarbon group containing from 6 to 16 carbon atoms.

2. A polyester of a polyhydric alcohol in which the polyfunctional acyl group has the formula

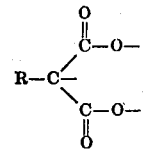

in which R is an unsaturated aliphatic hydrocarbon group containing from 6 to 16 carbon atoms.

3. A polyester of a polyhydric alcohol in which the polyfunctional acyl group has the formula

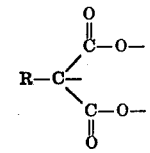

in which R is a saturated aliphatic hydrocarbon group containing from 6 to 16 carbon atoms.

4. A polyester of a polyhydric alcohol having at least three hydroxyl groups, the polyfunctional acyl group of the ester having the formula

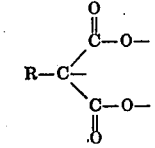

in which R is an aliphatic hydrocarbon group containing from 6 to 16 carbon atoms.

5. A polyester of a polyhydric alcohol having at least three hydroxyl groups, the polyfunctional acyl group of the ester having the formula

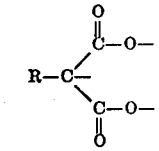

in which R is an unsaturated aliphatic hydrocarbon group containing from 6 to 16 carbon atoms.

6. A linear polyester of a dihydric alcohol, the polyfunctional acyl group of the ester having the formula

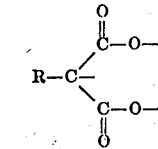

in which R is an unsaturated aliphatic hydrocarbon group containing from 6 to 16 carbon atoms.

7. Low molecular weight esters of polyhydric alcohols in which the polyfunctional acyl group has the formula

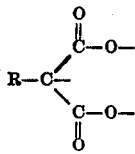

in which R is a saturated aliphatic hydrocarbon group having from 6 to 16 carbon atoms.

8. High molecular weight wax-like polyesters of a polyhydric alcohol in which the polyfunctional acyl group has the formula

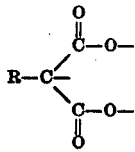

in which R is a saturated aliphatic hydrocarbon group having from 6 to 16 carbon atoms.

9. A polyester of a polyhydric alcohol in which the polyfunctional acyl group has the formula

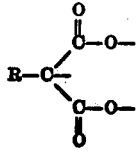

in which R is the mixture of complete aliphatic hydrocarbon groups represented by the radicals beyond the alpha carbon atom of the fatty acids of a fat.

10. A polyester of a polyhydric alcohol in which the polyfunctional acyl group has the formula

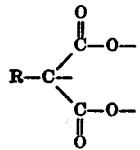

in which R is a mixture of complete aliphatic hydrocarbon groups represented by the radicals beyond the alpha carbon atom of the fatty acids of an unsaturated fat.

DON E. FLOYD.

REFERENCES CITED

The following references are of record in the file of this patent:

UNITED STATES PATENTS

| Number | Name | Date |
|---|---|---|
| 2,394,909 | Gleason | Feb. 12, 1946 |

FOREIGN PATENTS

| Number | Country | Date |
|---|---|---|
| 464,276 | Great Britain | April 12, 1937 |